United States Patent
Beckman et al.

(10) Patent No.: US 9,550,577 B1
(45) Date of Patent: Jan. 24, 2017

(54) ELECTRICITY GENERATION IN AUTOMATED AERIAL VEHICLES

(71) Applicant: Amazon Technologies, Inc., Reno, NV (US)

(72) Inventors: Brian C. Beckman, Newcastle, WA (US); Amir Navot, Seattle, WA (US); Daniel Buchmueller, Seattle, WA (US); Gur Kimchi, Bellevue, WA (US); Fabian Hensel, Zurich (CH); Scott A. Green, North Bend, WA (US); Brandon William Porter, Yarrow Point, WA (US); Severan Sylvain Jean-Michel Rault, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/315,944

(22) Filed: Jun. 26, 2014

(51) Int. Cl.
| | |
|---|---|
| *F03D 1/00* | (2006.01) |
| *F03D 1/02* | (2006.01) |
| *F03D 3/00* | (2006.01) |
| *B64D 41/00* | (2006.01) |
| *B64C 19/00* | (2006.01) |

(52) U.S. Cl.
CPC ............... *B64D 41/00* (2013.01); *B64C 19/00* (2013.01)

(58) Field of Classification Search
USPC ....... 701/3, 468–469; 244/190, 17.11, 17.17, 244/17.19, 17.13, 17.27, 6, 17.23, 53 R, 244/55–56; 318/140
See application file for complete search history.

(56) References Cited

U.S. PATENT DOCUMENTS

| | | | | |
|---|---|---|---|---|
| 7,482,767 | B2* | 1/2009 | Tether | B60L 7/10 318/139 |
| 8,018,079 | B2* | 9/2011 | Kelly | F03D 5/04 290/1 R |
| 8,393,564 | B2* | 3/2013 | Kroo | B64C 3/56 244/17.23 |
| 9,376,208 | B1* | 6/2016 | Gentry | B64C 39/024 |

(Continued)

OTHER PUBLICATIONS

Conceptualization and Multiobjective Optimization of the Electric System of an Airborne Wind Turbine; Kolar, J.W. ; Friedli, T. ; Krismer, F. ; Looser, A. ; Schweizer, M. ; Friedemann, R.A. ; Steimer, P.K. ; Bevirt, J.B.; Emerging and Selected Topics in Power Electronics, IEEE Journal of;vol. 1 , Issue: 2; DOI: 10.1109/JESTPE.2013.2269672.*

(Continued)

*Primary Examiner* — Cuong H Nguyen
(74) *Attorney, Agent, or Firm* — Athorus, PLLC

(57) ABSTRACT

This disclosure describes a system and method for operating an automated aerial vehicle wherein the battery life may be extended by performing one or more electricity generation procedures on the way to a destination (e.g., a delivery location for an item). In various implementations, the electricity generation procedure may include utilizing an airflow to rotate one or more of the propellers of the automated aerial vehicle so that the associated propeller motors will generate electricity (e.g., which can be utilized to recharge the battery, power one or more sensors of the automated aerial vehicle, etc.). In various implementations, the airflow may consist of a wind, or may be created by the kinetic energy of the automated aerial vehicle as it moves through the air (e.g., as part of a normal flight path and/or as part of an aerial maneuver).

21 Claims, 11 Drawing Sheets

(56) References Cited

U.S. PATENT DOCUMENTS

| | | | | |
|---|---|---|---|---|
| 2006/0175996 | A1* | 8/2006 | Tether | B60L 7/10 318/376 |
| 2008/0087762 | A1* | 4/2008 | Holloman | B64C 1/0009 244/30 |
| 2010/0213718 | A1* | 8/2010 | Kelly | F03D 5/04 290/55 |
| 2012/0012692 | A1* | 1/2012 | Kroo | B64C 3/56 244/6 |
| 2012/0091259 | A1* | 4/2012 | Morris et al. | 244/17.13 |
| 2012/0298790 | A1* | 11/2012 | Bitar | B64C 27/12 244/17.11 |
| 2012/0298793 | A1* | 11/2012 | Weddendorf | F03D 1/02 244/17.23 |
| 2013/0049364 | A1* | 2/2013 | Teets et al. | 290/45 |
| 2013/0066485 | A1* | 3/2013 | Matuszeski et al. | 701/2 |
| 2013/0146703 | A1* | 6/2013 | Pecnik | 244/30 |
| 2013/0214086 | A1* | 8/2013 | Kroo | B64C 3/56 244/6 |
| 2013/0307274 | A1* | 11/2013 | Sia | 290/55 |
| 2013/0341934 | A1* | 12/2013 | Kawanishi | 290/1 A |
| 2014/0097290 | A1* | 4/2014 | Leng | 244/6 |
| 2014/0103158 | A1* | 4/2014 | Berry | 244/2 |
| 2014/0117148 | A1* | 5/2014 | Dyrla | B64C 27/14 244/17.13 |
| 2014/0180914 | A1* | 6/2014 | Abhyanker | 705/39 |
| 2014/0236388 | A1* | 8/2014 | Wong | G09G 5/12 701/2 |
| 2014/0254896 | A1* | 9/2014 | Zhou | B64D 1/08 382/124 |
| 2014/0374535 | A1* | 12/2014 | Wong | G09G 5/12 244/17.23 |
| 2015/0115108 | A1* | 4/2015 | Benson | B60L 11/1809 244/53 R |
| 2015/0158581 | A1* | 6/2015 | Fengler | B64C 27/08 244/17.23 |
| 2015/0188400 | A1* | 7/2015 | Kemp | H02K 47/14 310/74 |

OTHER PUBLICATIONS

Influence of design parameters on sound power spectrum for general aviation propellers in forward flight; Lee, G.W.; Ferguson, F. Automation Congress, 2002 Proceedings of the 5th Biannual World; vol. 14; DOI: 10.1109/WAC.2002.1049481; Publication Year: 2002, pp. 459-464.*

Propulsion system model of a mini UAV system; S. Nihat Yanik; Ender Özyetiş; Güήlü Özcan; Nafiz Alemdaroğlu; Altan Kayran; Engin Kiran; Unmanned Aircraft Systems (ICUAS), 2014 International Conference on; Year: 2014; pp. 1073-1080, DOI: 10.1109/ICUAS.2014.6842359.*

Simulation, Design, and Validation of an UAV SOFC Propulsion System; Peter Lindahl; Eric Moog; Steven R. Shaw; IEEE Transactions on Aerospace and Electronic Systems; Year: 2012, vol. 48, Issue: 3; pp. 2582-2593, DOI: 10.1109/TAES.2012.6237610.*

A direct drive solution for contra-rotating propellers in electric unmanned aerial vehicle; G. Brando; A. Dannier; A. Del Pizzo; L. P. Di Noia; 2015 International Conference on Electrical Systems for Aircraft, Railway, Ship Propulsion and Road Vehicles (ESARS); Year: 2015; pp. 1-6, DOI: 10.1109/ESARS.2015.7101428.*

* cited by examiner

ELECTRICITY GENERATION IN AUTOMATED AERIAL VEHICLES

BACKGROUND

Automated aerial vehicles are continuing to increase in use. For example, automated aerial vehicles are often used for surveillance. While there are many beneficial uses of automated aerial vehicles, they also have many drawbacks. For example, automated aerial vehicles are often powered by batteries, which limit flight distances according to available battery life. In some implementations, larger batteries may be utilized, although such may increase the expense of operation and also add weight which requires additional energy during flight. Similarly, any other items or features that are added to or carried by the automated aerial vehicles (e.g., additional equipment for the automated aerial vehicles, other items transported by the automated aerial vehicles, etc.), add weight that requires additional energy during flight and thus further limits battery life.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
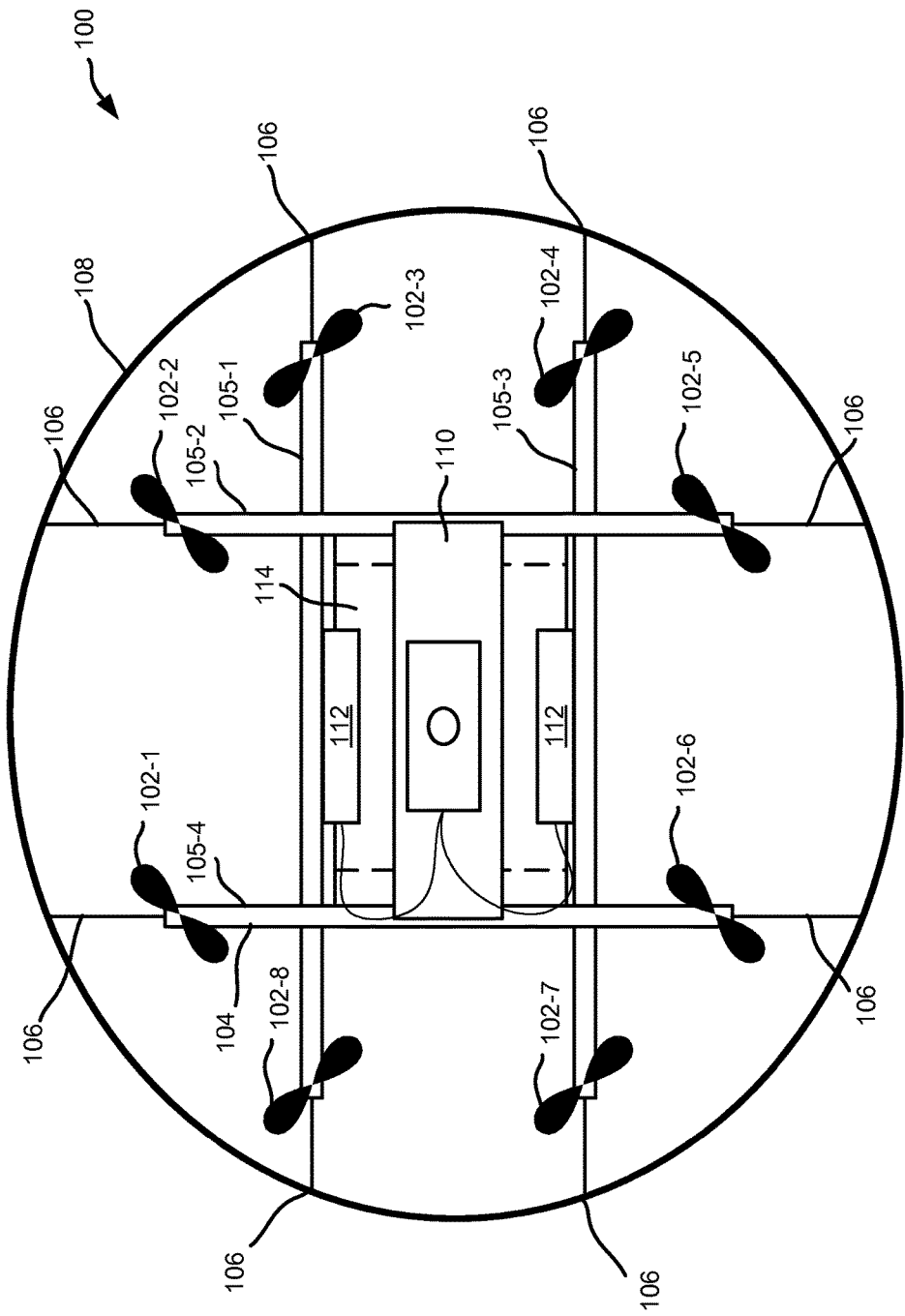
FIG. 1 depicts a block diagram of a top-down view of an automated aerial vehicle, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes an automated aerial vehicle ("AAV") and system that may perform one or more electricity generation procedures on the way to a destination (e.g., a delivery location for an item). As will be described in more detail below, electricity generation procedures may be utilized to extend the battery life of an AAV. In various implementations, battery life may be a primary limiting factor for many operations that may be performed with AAVs. For example, for an AAV that is utilized to transport an item (e.g., from a materials handling facility to a delivery location for a user), the combination of flight distance, speed of travel and weight of the item may be limited by the available battery life. By implementing electricity generation procedures that can be performed on the way to and/or from a destination, the available battery life can be extended and the utility of the AAV for transporting items may be improved.

In various implementations, an electricity generation procedure may include utilizing wind for rotating a propeller of the AAV. In this manner, a propeller motor that was previously supplied with electricity from the battery for turning the propeller may instead generate electricity as the propeller is turned by the wind. The generated electricity may be utilized for recharging the battery, powering one or more sensors of the AAV, or any other designated functions. In various implementations, the wind may be utilized to turn the one or more propellers while the AAV is flying, or alternatively while the AAV is parked at a location (e.g., on a rooftop) for the electricity generation procedure. As part of such procedures, the airflow from the wind may be monitored to determine if it is sufficient for an electricity generation procedure to be performed at a current AAV location, or at another location to which the AAV may fly (e.g., at a higher elevation which has been determined to have more wind, on a rooftop where high winds have been detected, etc.).

Electricity generation procedures may also be performed which utilize a relative airflow resulting from the kinetic energy of the AAV as it moves through the air. It will be appreciated that such procedures do not rely on the presence of wind conditions (e.g., the air can be relatively still while the relative airflow is created by the movement of the AAV). In various implementations, aerial maneuvers may be performed in order to increase the kinetic energy of the AAV for the electricity generation. For example, the AAV may be flipped upside down, or otherwise powered toward the ground in order to generate a high level of kinetic energy, which may be utilized for having one or more of the propellers spin rapidly (e.g., for correspondingly generating a high current for charging the battery). In other implementations, rather than utilizing an aerial maneuver, the kinetic energy of the AAV as it flies along its normal flight path may also be utilized. For example, as part of its normal flight path, the AAV may have a period of descent, for which the resulting relative airflow as the AAV moves down through the air may be utilized for rotating one or more propellers for electricity generation.

As part of the electricity generation procedures, the orientation of one or more of the propellers of the AAV may be adjusted to more efficiently utilize the airflow. For example, if an airflow will be coming toward the front of the AAV (e.g., a wind blowing horizontally against the AAV as it is parked on a rooftop or is flying), the orientation of a propeller for electricity generation may be adjusted to have the propeller face more forward from the AAV against the direction of the airflow. As another example, if it is known that the airflow will be approximately in a vertical direction (e.g., as the AAV is allowed to fall or is powered downward while in a normal horizontal orientation), the orientation of a propeller for electricity generation may be adjusted to have the propeller face more downward from the AAV against the direction of the airflow. In various implementations, such adjustments to the orientations of the propellers may be made individually (e.g., by adjusting the orientation of a motor mount or a blade pitch of a propeller), or for all of the propellers together (e.g., by adjusting the overall orientation of the AAV as a whole).

While the examples discussed herein primarily focus on AAVs in the form of an aerial vehicle utilizing multiple propellers to achieve flight (e.g., a quad-copter or octo-copter), it will be appreciated that the implementations discussed herein may be used with other forms of AAVs. A "relay location," as used herein, may include, but is not limited to, a delivery location, a materials handling facility, a cellular tower, a rooftop of a building, a delivery location, or any other location where an AAV can land, charge, retrieve inventory, replace batteries, receive service and or/execute an electricity generation procedure (e.g., by parking in a wind).

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items may be delivered. For example, the delivery location may be a person's residence, a place of business, a location within a materials handling facility (e.g., packing station, inventory storage), any location where a user or inventory is located, etc. Inventory or items may be any physical goods that can be transported using an AAV.

FIG. 1 illustrates a block diagram of a top-down view of an AAV 100, according to an implementation. As illustrated, the AAV 100 includes eight propellers 102-1, 102-2, 102-3, 102-4, 102-5, 102-6, 102-7, 102-8 spaced about the frame 104 of the AAV. The propellers 102 may be any form of propeller (e.g., graphite, carbon fiber) and of a size sufficient to lift the AAV 100 and any inventory engaged by the AAV 100 so that the AAV 100 can navigate through the air, for example, to deliver an inventory item to a location. While this example includes eight propellers, in other implementations, more or fewer propellers may be utilized. Likewise, in some implementations, the propellers may be positioned at different locations on the AAV 100. In addition, alternative methods of propulsion may be utilized. For example, fans, jets, turbojets, turbo fans, jet engines, and the like may be used to propel the AAV.

The frame 104 or body of the AAV 100 may likewise be of any suitable material, such as graphite, carbon fiber and/or aluminum. In this example, the frame 104 of the AAV 100 includes four rigid members 105-1, 105-2, 105-3, 105-4, or beams arranged in a hash pattern with the rigid members intersecting and joined at approximately perpendicular angles. In this example, rigid members 105-1 and 105-3 are arranged parallel to one another and are approximately the same length. Rigid members 105-2 and 105-4 are arranged parallel to one another, yet perpendicular to rigid members 105-1 and 105-3. Rigid members 105-2 and 105-4 are approximately the same length. In some embodiments, all of the rigid members 105 may be of approximately the same length, while in other implementations, some or all of the rigid members may be of different lengths. Likewise, the spacing between the two sets of rigid members may be approximately the same or different.

While the implementation illustrated in FIG. 1 includes four rigid members 105 that are joined to form the frame 104, in other implementations, there may be fewer or more components to the frame 104. For example, rather than four rigid members, in other implementations, the frame 104 of the AAV 100 may be configured to include six rigid members. In such an example, two of the rigid members 105-2, 105-4 may be positioned parallel to one another. Rigid members 105-1, 105-3 and two additional rigid members on either side of rigid members 105-1, 105-3 may all be positioned parallel to one another and perpendicular to rigid members 105-2, 105-4. With additional rigid members, additional cavities with rigid members on all four sides may be formed by the frame 104. As discussed further below, a cavity within the frame 104 may be configured to include an inventory engagement mechanism for the engagement, transport and delivery of item(s) and/or containers that contain item(s).

In some implementations, the AAV may be configured for aerodynamics. For example, an aerodynamic housing may be included on the AAV that encloses the AAV control system 110, one or more of the rigid members 105, the frame 104 and/or other components of the AAV 100. The housing may be made of any suitable material(s) such as graphite, carbon fiber, aluminum, etc. Likewise, in some implementations, the location and/or the shape of the inventory (e.g., item or container) may be aerodynamically designed. For example, in some implementations, the inventory engagement mechanism may be configured such that, when the inventory is engaged, it is enclosed within the frame and/or housing of the AAV 100 so that no additional drag is created during transport of the inventory by the AAV 100. In other implementations, the inventory may be shaped to reduce drag and provide a more aerodynamic design of the AAV and the inventory. For example, if the inventory is a container and a portion of the container extends below the AAV when engaged, the exposed portion of the container may have a curved shape.

The propellers 102 and corresponding propeller motors are positioned at both ends of each rigid member 105. For inventory transport purposes, the propeller motors may be any form of motor capable of generating enough speed with the propellers to lift the AAV 100 and any engaged inventory thereby enabling aerial transport of the inventory. For example, for these purposes the propeller motors may each be a FX-4006-13 740kv multi rotor motor. As will be described in more detail below, when the propeller motors are to be utilized for electricity generation procedures, they may also be any form of motor (e.g., permanent magnet, brushless, etc.) capable of generating electricity when the propellers are turned by an airflow (e.g., from a wind or the relative movement of the AAV 100 through the air).

Extending outward from each rigid member is a support arm 106 that is connected to a safety barrier 108. In this example, the safety barrier is positioned around and attached to the AAV 100 in such a manner that the motors and propellers 102 are within the perimeter of the safety barrier 108. The safety barrier may be plastic, rubber, etc. Likewise, depending on the length of the support arms 106 and/or the length, number or positioning of the rigid members 105, the safety barrier may be round, oval, or any other shape.

Mounted to the frame 104 is the AAV control system 110. In this example, the AAV control system 110 is mounted in the middle and on top of the frame 104. The AAV control system 110, as discussed in further detail below with respect to FIG. 9, controls the operation, routing, navigation, communication, electricity generation procedures, and the inventory engagement mechanism of the AAV 100.

Likewise, the AAV 100 includes one or more power modules 112. In this example, the AAV 100 includes two power modules 112 that are removably mounted to the frame 104. The power module for the AAV may be in the form of battery power, solar power, gas power, super capacitor, fuel cell, alternative power generation source, or a combination thereof. For example, the power modules 112 may each be a 6000 mAh lithium-ion polymer battery, polymer lithium ion (Li-poly, Li-Pol, LiPo, LIP, PLI or Lip) battery. The power module(s) 112 are coupled to and provide power for the AAV control system 110 and the propeller motors.

In some implementations, one or more of the power modules may be configured such that it can be autonomously recharged, removed and/or replaced with another power module while the AAV is landed. For example, when the AAV lands at a delivery location, relay location and/or materials handling facility, the AAV may engage with a charging member at the location that will recharge the power module and/or the power module may be removed and replaced.

As mentioned above, the AAV 100 may also include an inventory engagement mechanism 114. The inventory engagement mechanism may be configured to engage and disengage items and/or containers that hold items. In this example, the inventory engagement mechanism 114 is positioned within a cavity of the frame 104 that is formed by the intersections of the rigid members 105. The inventory engagement mechanism may be positioned beneath the AAV control system 110. In implementations with additional rigid members, the AAV may include additional inventory engagement mechanisms and/or the inventory engagement mechanism 114 may be positioned in a different cavity within the frame 104. The inventory engagement mechanism may be of any size sufficient to securely engage and disengage containers that contain inventory. In other implementations, the engagement mechanism may operate as the container, containing the inventory item(s) to be delivered. The inventory engagement mechanism communicates with (via wired or wireless communication) and is controlled by the AAV control system 110.

While the implementations of the AAV discussed herein utilize propellers to achieve and maintain flight, in other implementations, the AAV may be configured in other manners. For example, the AAV may include fixed wings and/or a combination of both propellers and fixed wings. For example, the AAV may utilize one or more propellers to enable takeoff and landing and a fixed wing configuration or a combination wing and propeller configuration to sustain flight while the AAV is airborne.

Figure 2:
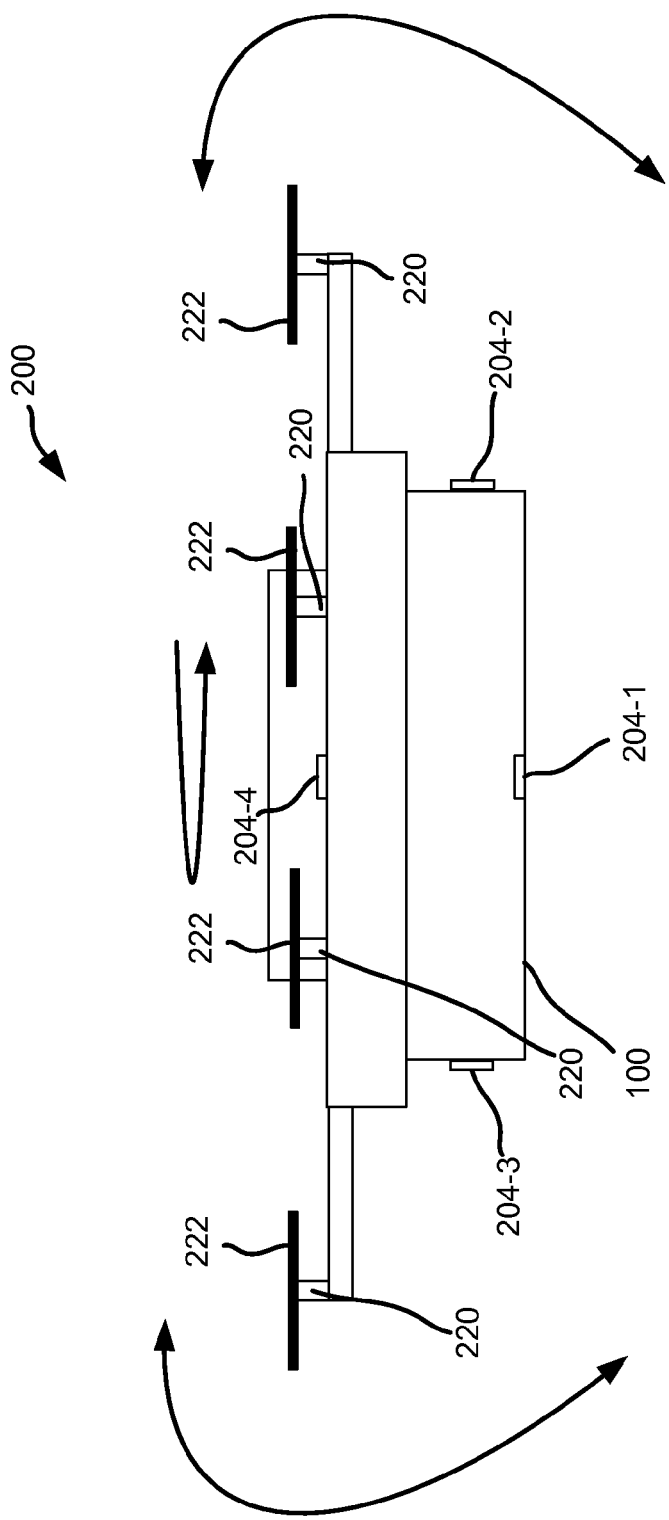
FIG. 2 depicts a block diagram of a side view of an automated aerial vehicle, according to an implementation.

FIG. 2 depicts a block diagram of a side view 200 of an AAV 100, according to an implementation. In the side view of the AAV illustrated in FIG. 2, four motors 220 and propellers 222 are visible. In other implementations, additional or fewer motors 220 and/or propellers may be included in the AAV 100. In this example, the motors 220 may all be mounted at 90 degrees with respect to the AAV 100. As will be described in more detail below with respect to FIG. 3, in an alternative implementation the mountings of the motors may be adjustable.

As will be described in more detail below, during an electricity generation procedure, an airflow relative to the AAV (e.g., from a wind or a relative movement of the AAV through the air) may be utilized to rotate one or more propellers to generate electricity. As part of the electricity generation procedure, one or more of the propellers may be oriented so as to most effectively utilize the available airflow. For example, if the relative airflow will be moving horizontally (e.g., from a wind), it may be desirable to adjust the relative orientation of the one or more propellers utilized for electricity generation to at least partially face the relative airflow. As another example, if the relative airflow will be moving vertically (e.g., as the AAV is allowed to fall through the air or is powered downward while in a horizontal orientation), a corresponding horizontal orientation of the one or more propellers for electricity generation may be desirable.

For configurations such as that illustrated in FIG. 2 where the propellers are fixed relative to the body of the AAV, adjustments to the orientation of the propellers may be accomplished in some instances by manipulating the pitch, yaw and/or roll of the AAV as a whole. As noted above, such adjustments may be made to better orient the one or more propellers that are utilized for electricity generation with respect to the relative airflow. As will be described in more detail below with respect to FIG. 3, in an implementation where the orientation of one or more of the propellers may be individually adjustable with respect to the body of the AAV, the pitch, yaw and/or roll may also be utilized to orient a particular electricity generating propeller toward the relative airflow. It will be appreciated that with AAVs, such as a quad-copter or an octo-copter, the general direction of travel of the AAV may be maintained even though the pitch, yaw and roll is altered. For example, an AAV may be moving north and the yaw may be adjusted so that the AAV 100 rotates in a clockwise direction (e.g., so as to position a particular electricity generating propeller toward the airflow). The rotation can occur without altering the direction of flight. Likewise, the pitch and/or roll can be adjusted without altering the flight path of the AAV 100.

As shown in FIG. 2, various airflow sensors may be mounted to the AAV 100. For example, an airflow sensor 204-1 may be mounted near the bottom of the AAV 100. Similarly, airflow sensors 204-2, 204-3 and 204-4 may be mounted to the front, back and top of the AAV 100, respectively. The airflow sensors 204 may be utilized to determine a direction and speed of a relative airflow (e.g., from a wind or the AAV moving through the air), which may correspondingly be utilized to determine a desired orientation of one or more propellers utilized for electricity generation. The airflow sensors 204 may also be utilized to determine if and when an electricity generation procedure should be initiated (e.g., when a speed of a wind is determined to be above a designated threshold that indicates that the wind is sufficient for an electricity generation procedure to be performed). While the example illustrated in FIG. 2 includes four airflow sensors 204 mounted to the AAV 100, in other implementations, fewer or additional airflow sensors may be utilized.

In one implementation, as an alternative or in addition to an airflow sensor 204, a feedback system from the propellers may be utilized for indicating a relative airflow. For example, if a wind against the direction of travel of an AAV increases, more power may be required for flying the AAV in that direction at a given speed. This increase in required power may be monitored and utilized to indicate the relative airflow against the AAV. Airflow from different directions may similarly be determined (e.g., a wind helping push the AAV from behind may require less power for flying the AAV which may be correspondingly monitored as an indication of the relative airflow). In another implementation, as an alternative or in addition to such techniques for determining the relative airflow, the orientation of one or more propellers may be varied to determine the most effective available orientation. For example, the electricity output from the one or more propellers utilized for electricity generation may be tracked as the orientation is changed, in order to determine an orientation that produces the highest output. As will be described in more detail below with respect to FIG. 3, in one implementation the orientation of one or more of the propellers may be individually adjustable with respect to the body of the AAV.

Figure 3:
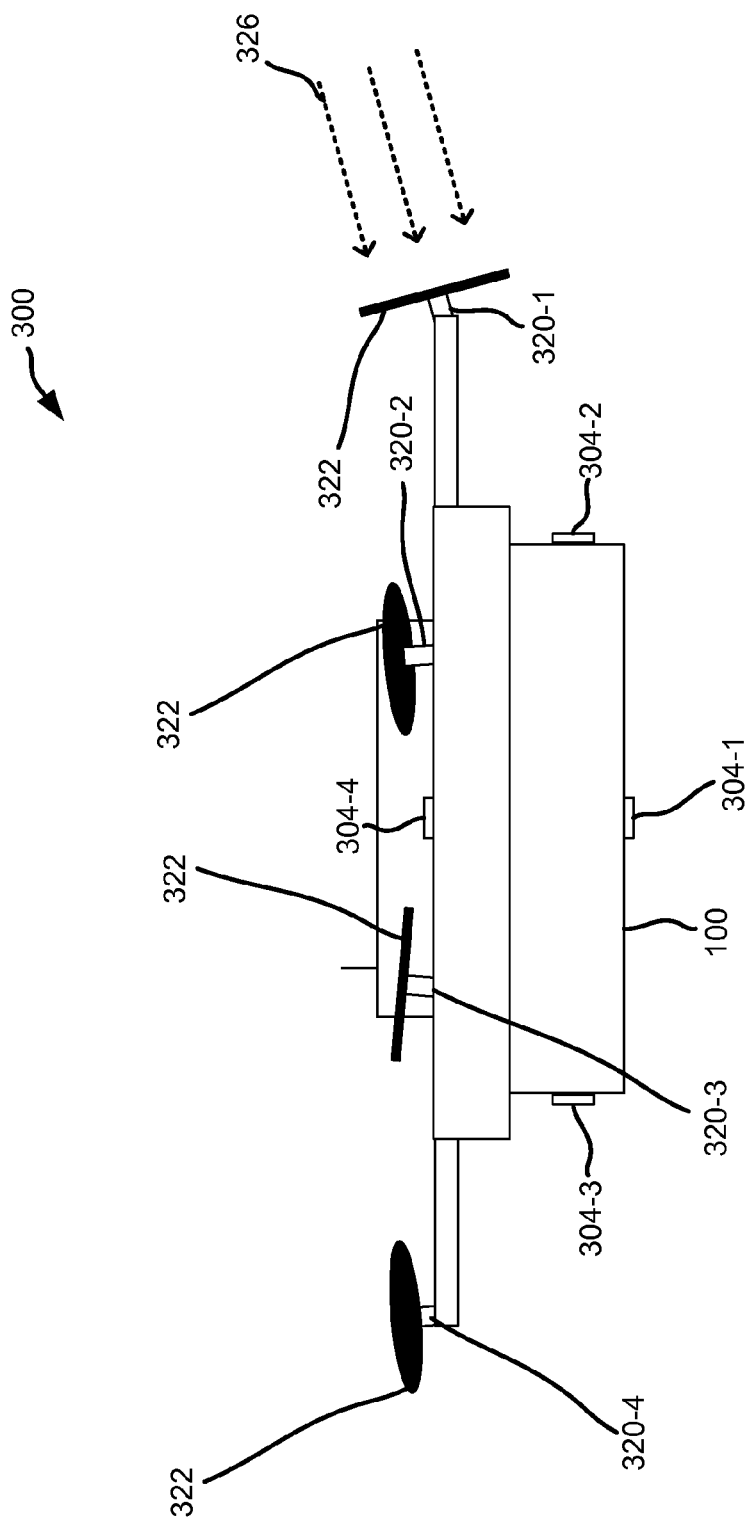
FIG. 3 depicts a block diagram of another side view of an automated aerial vehicle, according to an implementation.

FIG. 3 depicts a block diagram of another side view 300 of an automated aerial vehicle 100, according to an implementation. As shown in FIG. 3, four motors 320-1 to 320-4 and corresponding propellers 322 are visible. In other implementations, additional or fewer motors 320 and/or propellers may be included in the AAV 100. For example, in some implementations, propellers may be mounted in pairs. In addition, four airflow sensors 304-1 to 304-4 are illustrated as attached to the body of the AAV, which may operate similarly to the airflow sensors 204-1 to 204-4 described above with respect to FIG. 2.

FIG. 3 illustrates the right side view of the AAV 100 such that the motor 320-1 is at the front of the AAV 100 and the motor 320-4 is at the rear of the AAV 100. The motors 320 and corresponding propellers 322 may have an orientation that is offset in any direction with respect to the body of the AAV 100, and the offset may be adjustable. In some implementations, the orientation offset of one or more of the motors 320 may be adjusted while the AAV is in operation. For example, during normal flight, all of the motors 320 may be positioned with 0 degrees of offset (e.g., wherein the plane of rotation of the propeller is approximately parallel to a top surface of the body of the AAV). When a determination is made that an electricity generation procedure is to be performed, the orientation of one or more of the motors 320 and corresponding propellers 322 may be adjusted to better utilize an available airflow for the electricity generation. Once the electricity generation procedure is complete, the one or more motors 320 and corresponding propellers 322 may be reoriented (e.g., back to a 0 degree offset) and may be turned back on (i.e., utilizing electricity supplied by a battery) to assist with flying the AAV along a flight path.

As an example, as part of an electricity generation procedure, the orientation of the motor 320-1 is shown to have been altered such that the corresponding propeller 322 faces an airflow 326 (e.g., from a wind). In one implementation, such an electricity generation procedure may be performed while the AAV is parked. For example, as part of its travel to a destination, the AAV may be temporarily parked (e.g., on the ground, on top of a building, on top of another type of structure such as a cell tower, etc.). Once parked, the orientation of the motor 320-1 and corresponding propeller 322 may be adjusted to the illustrated orientation. In the illustrated orientation, the airflow 326 may be utilized to rotate the propeller 322 and correspondingly generate electricity from the motor 320-1. In another implementation, the electricity generation procedure may be performed while the AAV is in-flight. As an example, the airflow 326 (e.g., a high wind) may be detected at a particular elevation, to which the AAV may fly such that the airflow 326 may rotate the propeller 322 for electricity generation. As another example, rather than a wind, the airflow 326 may result from the relative movement of the AAV through the air due to the kinetic energy of the AAV as it continues to move in a direction in which it has been flying. In various implementations, adjustments to the orientations of the motors 320 and corresponding propellers 322 may also be made to increase the agility of the AAV 100. For example, some of the motors (e.g., 320-2, 320-3 and 320-4) and corresponding propellers 322 may be offset between approximately 0-10 degrees with respect to the body of the AAV 100 and/or each other, in order to increase the agility of the AAV 100.

Figure 4A:
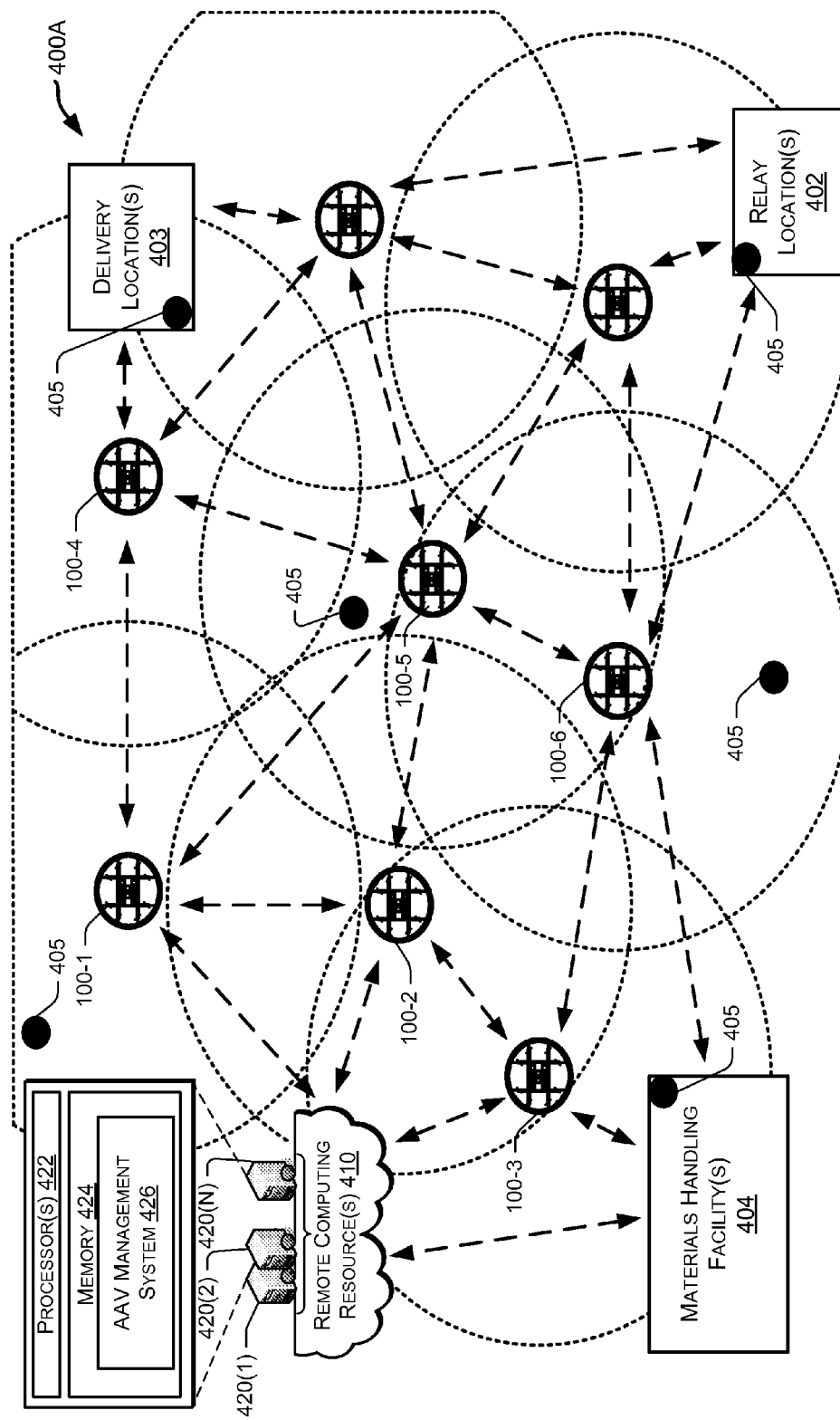
FIGS. 4A and 4B depict diagrams of an automated aerial vehicle environment through which an automated aerial vehicle is able to travel and perform electricity generation processes, according to some implementations.

FIG. 4A depicts a block diagram of an AAV network 400A that includes AAVs 100, delivery locations 403, relay locations 402, materials handling facilities 404 and remote computing resources 410, according to an implementation. In addition, one or more fixed position transmitters 405 may be included in the environment that transmit fixed position information (e.g., geographic coordinates). The fixed position transmitters may be included at any known, fixed location. For example, the fixed position transmitters may be included on a materials handling facility(s) 404, relay location(s) 402, delivery location(s) 403, on cellular towers (not shown), on buildings, on landing areas, or at any other known location. In various implementations, at least some known locations with fixed position transmitters may correspond to locations where electricity generation procedures may be performed. For example, a known location on top of a building or a cellular tower may include an airflow sensor and transmitter which indicates when high winds are present. Such a condition may provide an opportunity for a nearby AAV 100 to park and execute an electricity generation procedure that utilizes the high wind.

Each of the AAVs 100, delivery locations 403, relay locations 402, materials handling facilities 404 and/or remote computing resources 410 may be configured to communicate with one another. For example, the AAVs 100 may be configured to form a wireless mesh network that utilizes Wi-Fi or another wireless means of communication, each AAV communicating with other AAVs within wireless range. In other implementations, the AAVs 100, AAV management system 426, materials handling facilities 404, relay locations 402 and/or the delivery locations 403 may utilize existing wireless networks (e.g., cellular, Wi-Fi, satellite) to facilitate communication. Likewise, the remote computing resources 410, materials handling facilities 404, delivery locations 403 and/or relay locations 402 may also be included in the wireless mesh network. In some implementations, one or more of the remote computing resources 410, materials handling facilities 404, delivery locations 403 and/or relay locations 402 may also communicate with each other via another network (wired and/or wireless), such as the Internet.

The remote computing resources 410 may form a portion of a network-accessible computing platform implemented as a computing infrastructure of processors, storage, software, data access, and other components that is maintained and accessible via a network, such as the mesh network and/or another wireless or wired network (e.g., the Internet). As illustrated, the remote computing resources 410 may include one or more servers, such as servers 420(1), 420(2), . . . , 420(N). These servers 420(1)-(N) may be arranged in any number of ways, such as server farms, stacks, and the like that are commonly used in data centers. Furthermore, the servers 420(1)-(N) may include one or more processors 422 and memory 424 which may store an AAV management system 426.

The AAV management system 426 may be configured, for example, to communicate with the delivery locations 403, AAVs 100, materials handling facilities 404, and/or relay locations 402. As an example, position information for each AAV 100 may be determined and shared among AAVs. Each AAV may periodically transmit, for example, ADS-B information to other AAVs in the network. When information, such as ADS-B information, is sent to or from an AAV, the information may include an identifier for the AAV and each AAV may act as a node within the network, forwarding the information until it is received by the intended AAV. For example, the AAV management system 426 may send a message to AAV 100-6 by transmitting the information and the identifier of the intended receiving AAV to one or more of AAVs 100-1, 100-2, 100-3, 100-4 that are in wireless communication with the AAV management system 426. Each receiving AAV will process the identifier to determine if it is the intended recipient and then forward the information to one or more other AAVs that are in communication with the AAV. For example, AAV 100-2 may forward the message and the identification of the intended receiving AAV to AAV 100-1, 100-3 and 100-5. In such an example, because 100-3 has already received and forwarded the message, it may discard the message without forwarding it again, thereby reducing load on the mesh network 400A. The other AAVs, upon receiving the message, may determine that they are not the intended recipients and forward it on to other nodes. This process may continue until the message reaches the intended recipient.

In some implementations, if an AAV loses communication with other AAVs via the wireless mesh network, it may activate another wireless communication path to regain connection. For example, if an AAV cannot communicate with any other AAVs via the mesh network 400A, it may activate a cellular and/or satellite communication path to obtain communication information from the AAV management system 426, materials handling facility 404, relay location 402 and/or a delivery location 403. If the AAV still cannot regain communication and/or if it does not include an alternative communication component, it may automatically and autonomously navigate toward a designated location (e.g., a nearby materials handling facility 404, relay location 402 and/or delivery location 403).

The wireless mesh network 400A may be used to provide communication between AAVs (e.g., to share weather information including wind speeds and directions, location information, routing information, landing areas), the AAV management system 426, materials handling facilities 404, delivery locations 403 and/or relay locations 402. In various implementations, such communications may facilitate the execution of various electricity generation procedures. For example, indications regarding wind speeds and directions at various locations may be utilized for determining when and where certain electricity generation procedures will be performed. As another example, the communications may also indicate locations and conditions where it will be safe for an AAV to perform certain aerial maneuvers that may be utilized as part of electricity generation procedures. Such communications may also assist with choices as to which electricity generation procedures should be performed. For example, an AAV may have limited time for performing electricity generation procedures (e.g., due to a delivery deadline for an item that the AAV is transporting). Communications regarding the conditions (e.g., wind speeds and directions) at various locations may assist in making a choice of which electricity generation procedure to perform out of many that the AAV may perform on the way to the delivery location.

In addition, in some implementations, the wireless mesh network may be used to deliver content and/or other information to other computing resources, such as personal computers, electronic book reading devices, audio players, mobile telephones, tablets, desktops, laptops, etc. For example, the mesh network may be used to deliver electronic book content to electronic book reading devices of customers.

Figure 4B:
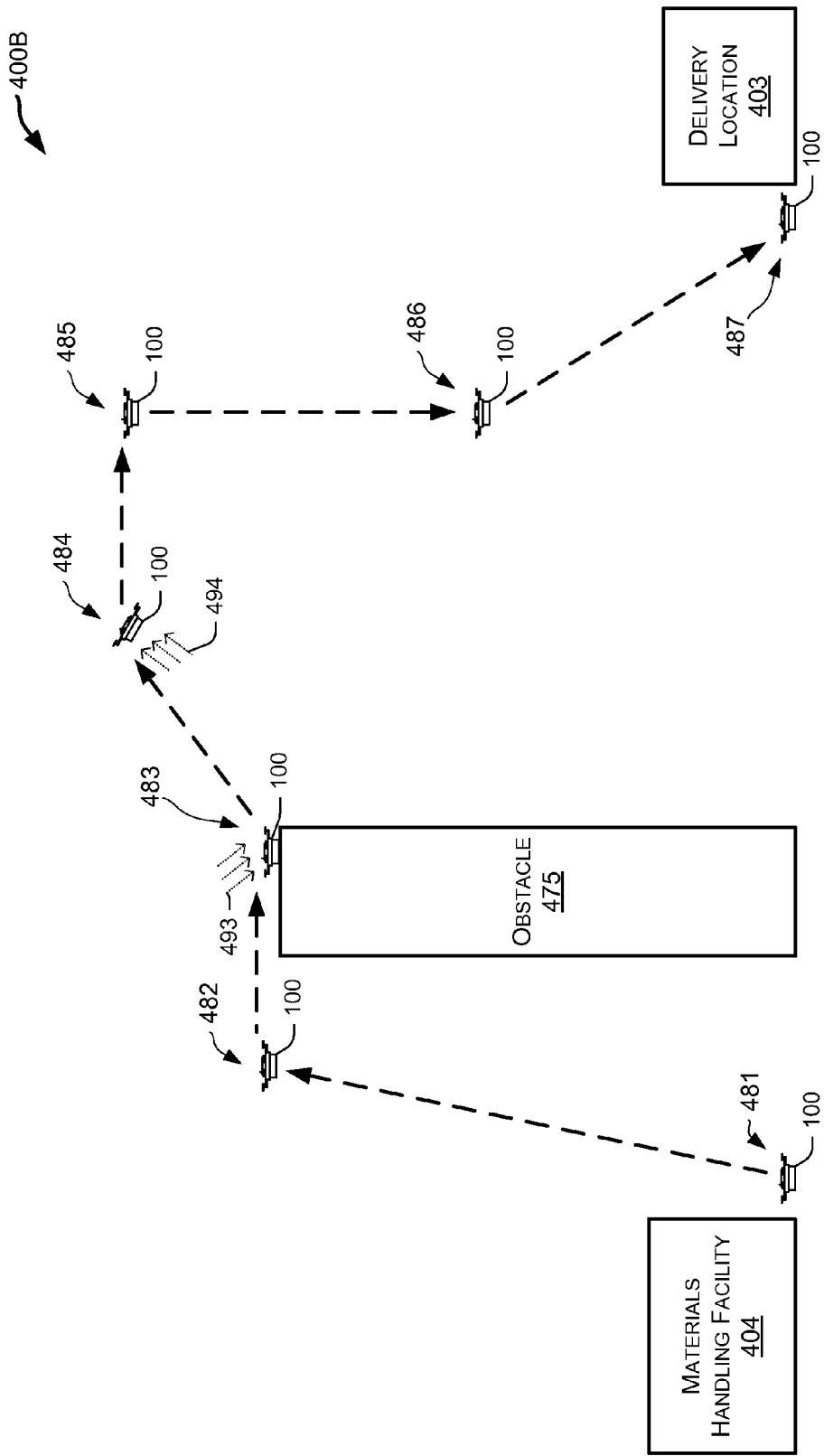

FIG. 4B depicts a diagram of an automated aerial vehicle environment 400B through which an AAV 100 is able to travel and perform electricity generation procedures, according to an implementation. As illustrated in FIG. 4B, an example flight path for the AAV 100 begins at a materials handling facility 404, goes over an obstacle 475 (e.g., representing one or more buildings, cell towers, tall geographic features, high regions, etc.), and ends at a delivery location 403. The starting point for the example flight path is at an initial position 481 which is proximate to the materials handling facility 404, from which the AAV 100 takes off and flies up to a position 482, which is at a sufficient altitude for the AAV 100 to be able to fly over the obstacle 475.

The AAV 100 is then landed so as to be temporarily parked on top of the obstacle 475 at a position 483 in order to perform an electricity generation procedure utilizing an airflow from a wind 493. As illustrated, the wind 493 is directed at a downward angle toward the top of the obstacle 475. Such electricity generation procedures utilizing wind will be described in more detail below with respect to FIG. 6. Briefly, while the AAV 100 is temporarily parked at the position 483, the wind 493 is utilized to rotate one or more of the propellers of the AAV 100 in order to generate electricity.

Once the electricity generation procedure at the position 483 is complete, the AAV 100 takes off and flies to a position 484 where another electricity generation procedure is performed utilizing an airflow from a wind 494. As illustrated, the wind 494 is directed at an upward angle which assists the AAV 100 in flying along the flight path. As noted above, such electricity generation procedures utilizing wind will be described in more detail below with respect to FIG. 6. Briefly, while the AAV 100 is at the position 484, the orientation of the AAV 100 as a whole may be adjusted so as to cause the propellers of the AAV 100 to be oriented to be more efficiently rotated by the airflow from the wind 494. Other techniques for orienting propellers (e.g., orienting a propeller individually relative to the body of the AAV, adjusting the pitch of a propeller, etc.) will be described in more detail below with respect to FIG. 8. In the example of FIG. 4B, the airflow from the wind 494 may be utilized to help the AAV 100 maintain its current elevation and direction of travel along the flight path, during which the airflow from the wind 494 may also be utilized to rotate one or more of the propellers of the AAV 100 for generating electricity.

As the example flight path continues, the AAV flies to a position 485 where an aerial maneuver is initiated as part of an electricity generation procedure. The aerial maneuver that is initiated at the position 485 may at least in part utilize the kinetic energy of the AAV 100 and a resulting relative airflow as the AAV moves through the air to generate electricity. Such electricity generation procedures utilizing the kinetic energy of the AAV will be described in more detail below with respect to FIG. 7. Briefly, the aerial maneuver that is initiated at the position 485 may include an aerial technique to increase the kinetic energy of the AAV. For example, the AAV may be allowed to fall, or may alternatively be flown toward the ground, from which the kinetic energy of the AAV may be allowed to increase to a relatively significant level. Once the kinetic energy has reached a high level, one or more of the propellers may be allowed to convert the high relative airflow resulting from the high kinetic energy to a high spin rate, which may correspondingly generate a high current (e.g., for charging a battery, etc.). In an implementation where the AAV is to fly toward the ground, various techniques may be utilized (e.g. reversing the direction of rotation of the propellers, flipping the AAV upside down and flying downward, altering the pitch of the propellers to produce downward force, etc.).

As the example flight path continues, the AAV reaches a position 486, from which the AAV 100 begins to fly in a downward angled direction toward a destination at a position 487 that is proximate to the delivery location 403. As the AAV 100 travels downward as part of the regular flight path, the kinetic energy of the AAV may be utilized as part of an electricity generation procedure. As noted above, such electricity generation procedures utilizing the kinetic energy of the AAV will be described in more detail below with respect to FIG. 7. Briefly, the movement of the AAV through the air as it descends toward the destination creates an effective airflow relative to the AAV which may be utilized to rotate the one or more propellers for the electricity generation. As the relative airflow is utilized to rotate the one or more propellers for electricity generation, at least some of the kinetic energy is effectively converted to electrical energy, which in some implementations may also be utilized as part of a braking procedure for slowing the relative movement of the AAV through the air.

It will be appreciated that, unlike the electricity generation procedures performed at the positions 483 and 484, wherein specific wind conditions may be required for the generation of electricity, the utilization of the kinetic energy of the AAV for the electricity generation procedures that are performed at the positions 485 and 486 may be executed even when the air is otherwise relatively still and no wind exists. The electricity generation procedures performed at the positions 485 and 486 may in part help recapture some of the energy that was utilized during previous portions of the example flight path (e.g., for increasing elevation and/or flying over the obstacle 475). It will be appreciated that each of the electricity generation procedures described above with respect to the example flight path (e.g., at the positions 483, 484, 485 and 486), may be utilized to help extend the battery life of the AAV, as will be described in more detail below with respect to FIGS. 5-8.

Figure 5:
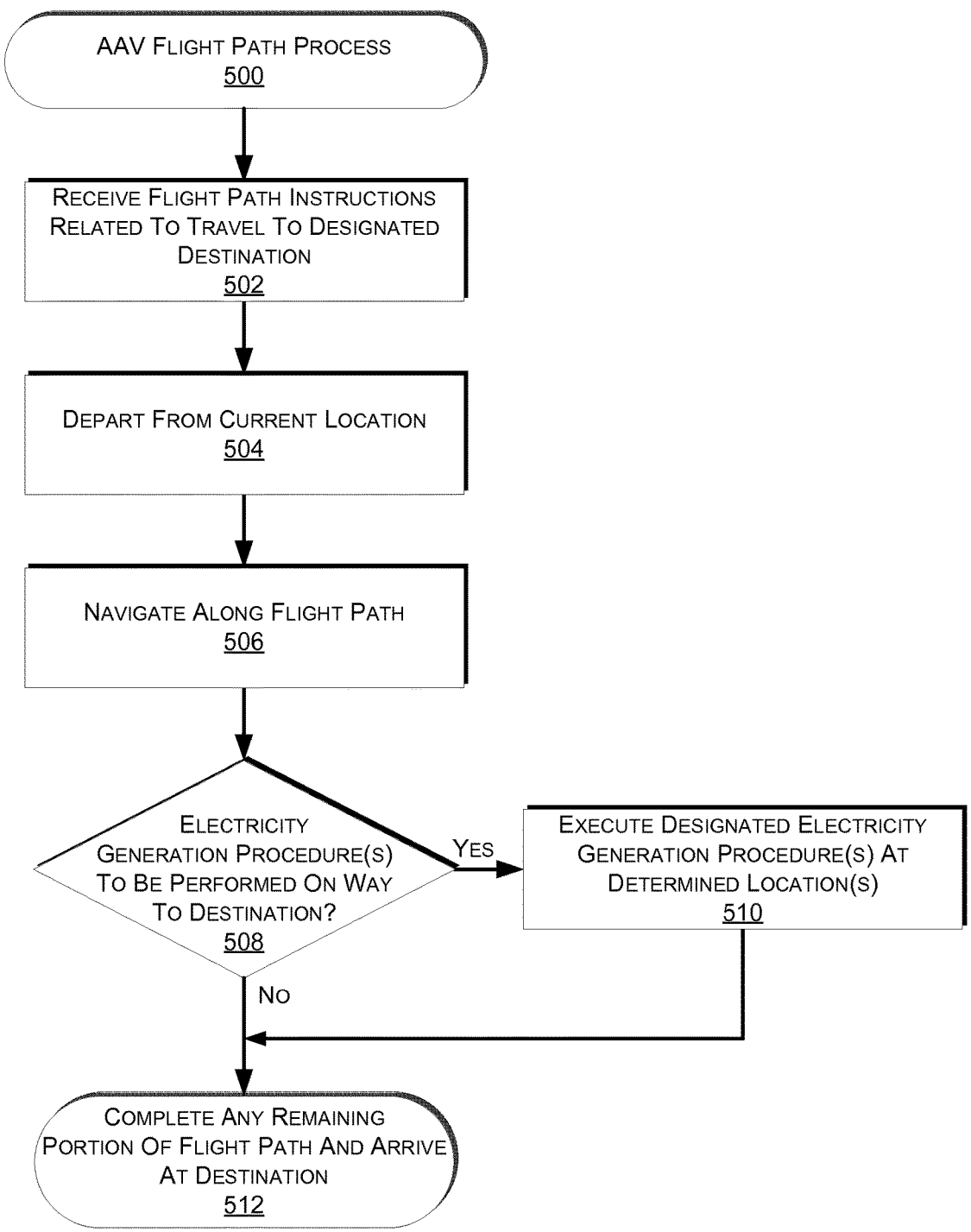
FIG. 5 depicts a flow diagram of an automated aerial vehicle flight path process, according to some implementations.

FIG. 5 is a flow diagram illustrating an example AAV flight path process 500, according to an implementation. This process, and each process described herein, may be implemented by the architectures described herein or by other architectures. The process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

The example process 500 begins with an AAV receiving flight path instructions related to travel to a destination, as in 502. In various implementations, the destination may be related to a delivery process or other functions of the AAV. For example, with respect to a delivery process, an order for an item may be received, and an AAV may be selected for transporting the item from a materials handling facility to a delivery location for a user (e.g., see FIGS. 4A and 4B). As another example, after the delivery is completed, the destination may become the materials handling facility to which the AAV returns. In various implementations, the flight path instructions may be determined by the AAV control system 110, or by the AAV management system 426 or other remote computing resource, or by a combination of such systems. For example, the AAV management system 426 or other remote computing resource may send basic flight path instructions to the AAV (e.g., including the start and end points), while the AAV control system 110 may have navigation capabilities that allow the rest of the flight path instructions to be determined.

Once the flight path instructions have been received, the AAV departs from its current location, as in 504. As noted above, in various implementations the current location may be associated with a materials handling facility, a delivery location after a delivery has been completed, etc. Once the AAV departs, the AAV navigates along the flight path, as in 506. As part of the navigation, the AAV may follow a route as generally indicated by the flight path instructions, and may also have capabilities for sensing and reacting to any dynamic events that may occur (e.g., avoiding any obstacles such as other AAVs, structures, etc.).

While the AAV is navigating along the flight path, a determination is made as to whether one or more electricity generation procedures will be performed on the way to the destination, as in 508. Various examples of electricity generation procedures will be described in more detail below with respect to FIGS. 6 and 7. For example, a relative airflow (e.g., from wind or kinetic energy of the AAV as it moves through the air) may be utilized for rotating a propeller of the AAV to generate electricity from an associated propeller motor that is otherwise generally used for flying the AAV. It will be appreciated that the utilization of a propeller to generate electricity can help extend the battery life of the AAV. If one or more electricity generation procedures are to be performed on the way to the destination, the designated electricity generation procedures are executed at determined locations, as in 510. Once the electricity generation procedures have been executed, as in 510, or if no electricity generation procedures are to be performed, as in 508, the AAV completes any remaining portion of its flight path and arrives at its destination, as in 512.

In various implementations, the determination as to whether any electricity generation procedures will be performed, as well as various associated steps for executing the procedures (e.g., for orienting one or more propellers), may be determined by the AAV control system 110, or by the AAV management system 426 or other remote computing resources, or by a combination of such systems. For example, the AAV management system 426 or other remote computing resources may receive data regarding an AAV position, battery charge level, wind conditions, etc., and may perform regular computations regarding the most efficient combination of electricity generation procedures and other activities that the AAV may perform on the way to the destination. In such implementations, instructions may be sent to the AAV control system 110 which may indicate when, where and/or how long particular electricity generation procedures should be performed, which the AAV control system 110 may implement, contribute to and/or alter according to current conditions at the AAV. Alternatively, the AAV control system 110 may in combination or independently perform such computations to determine the most efficient combination of electricity generation procedures and activities, and may correspondingly execute any determined electricity generation procedures on the way to the destination.

Figure 6:
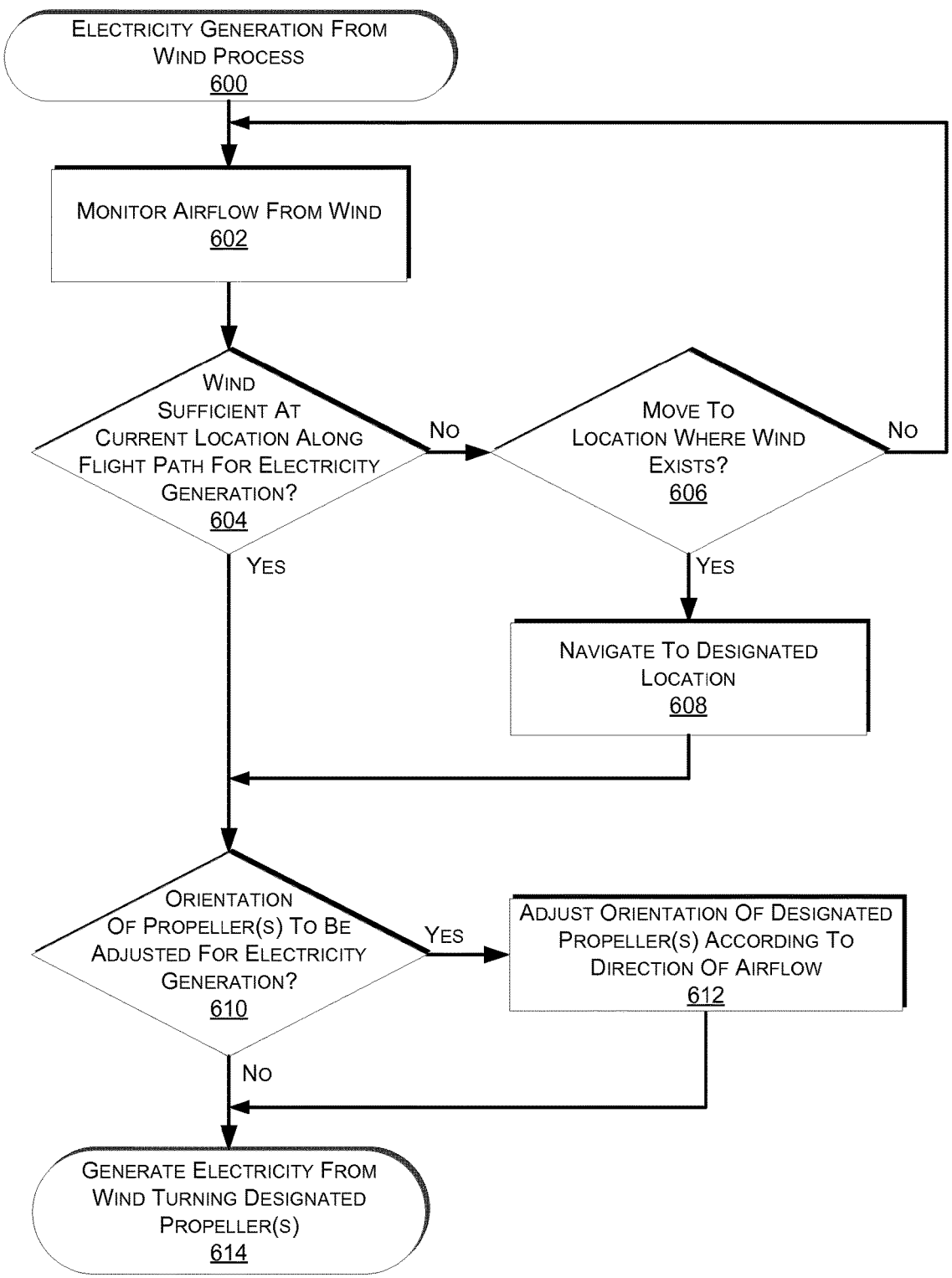
FIG. 6 depicts a flow diagram of an electricity generation from wind process, according to some implementations.

FIG. 6 depicts a flow diagram of an example electricity generation from wind process 600, according to some implementations. The example process begins with a monitoring of the wind, as in 602. In various implementations, the wind may be monitored by various sensors and/or other feedback systems of the AAV as it flies along its flight path. For example, airflow sensors 204 or 304 may be utilized for monitoring the wind. As another example, a high wind against which the AAV is flying may require that the electrical output for the propeller motors be increased in order to maintain the flight of the AAV (e.g., at a given speed), which can be monitored as an indication of the wind in which the AAV is flying. In addition to monitoring the wind at the AAV, the wind may also be monitored at various locations to which the AAV may fly. For example, other AAVs in the area may report the wind at their locations (e.g., including wind directions, speeds, etc.). As another example, a location that frequently has high winds (e.g., a location on top of a building or other structure) may include a sensor and a transmitter that reports current wind conditions.

As the wind is monitored, a determination is made as to whether the wind is sufficient at a current location of the AAV along the flight path for electricity generation, as in 604. If the wind is not sufficient at the current location, a determination is made as to whether the AAV will move to a location where wind exists, as in 606. If the AAV will not move to a location where wind exists, the process returns to block 602, where the wind will continue to be monitored. If the AAV will move to a location where wind exists, the AAV navigates to the designated location, as in 608.

Once the AAV has flown to the designated location where wind exists, as in 608, or if the wind is sufficient at the current location of the AAV, as in 604, a determination is made as to whether the orientation of one or more propellers will be adjusted for electricity generation, as in 610. In various implementations, a determination may correspondingly be made as to which propellers may be utilized for the electricity generation. For example, depending on the current weight of the AAV and any items being carried, only some of the propellers of the AAV may currently be required for flying, while other propellers may be made available for electricity generation. It will be appreciated that when a propeller is to be utilized for electricity generation, the AAV control system 110 may cease supplying electricity to the motor that rotates the propeller, after which the motor may effectively enter an electricity generation mode as the propeller is turned by the wind. In various implementations, any electricity generated by the turning of the propeller may be utilized for specified functions, such as recharging a battery of the AAV, powering a sensor of the AAV, etc., (e.g., as may be controlled by a switching function of the AAV control system 110).

If one or more of the propellers is to be adjusted for electricity generation, as in 610, the orientation of the designated propellers may be adjusted according to the direction of the airflow, as in 612. A process for adjusting the orientation of the propellers according to the direction of the airflow will be described in more detail below with respect to FIG. 8. Once the orientation of the propellers has been adjusted, as in 612, or if the orientation of the propellers will not be adjusted, as in 610, electricity is generated from the wind turning the designated propellers, as in 614.

In various implementations, the shape of a body of the AAV and certain related features may also be taken into account with regard to the utilization of the wind for turning the propellers for generating electricity. For example, an AAV may include wings or otherwise have an aerodynamic profile that allows the AAV to "glide" on the wind such that continuing flight may be maintained while one or more propellers is turned by the wind to generate electricity.

Figure 7:
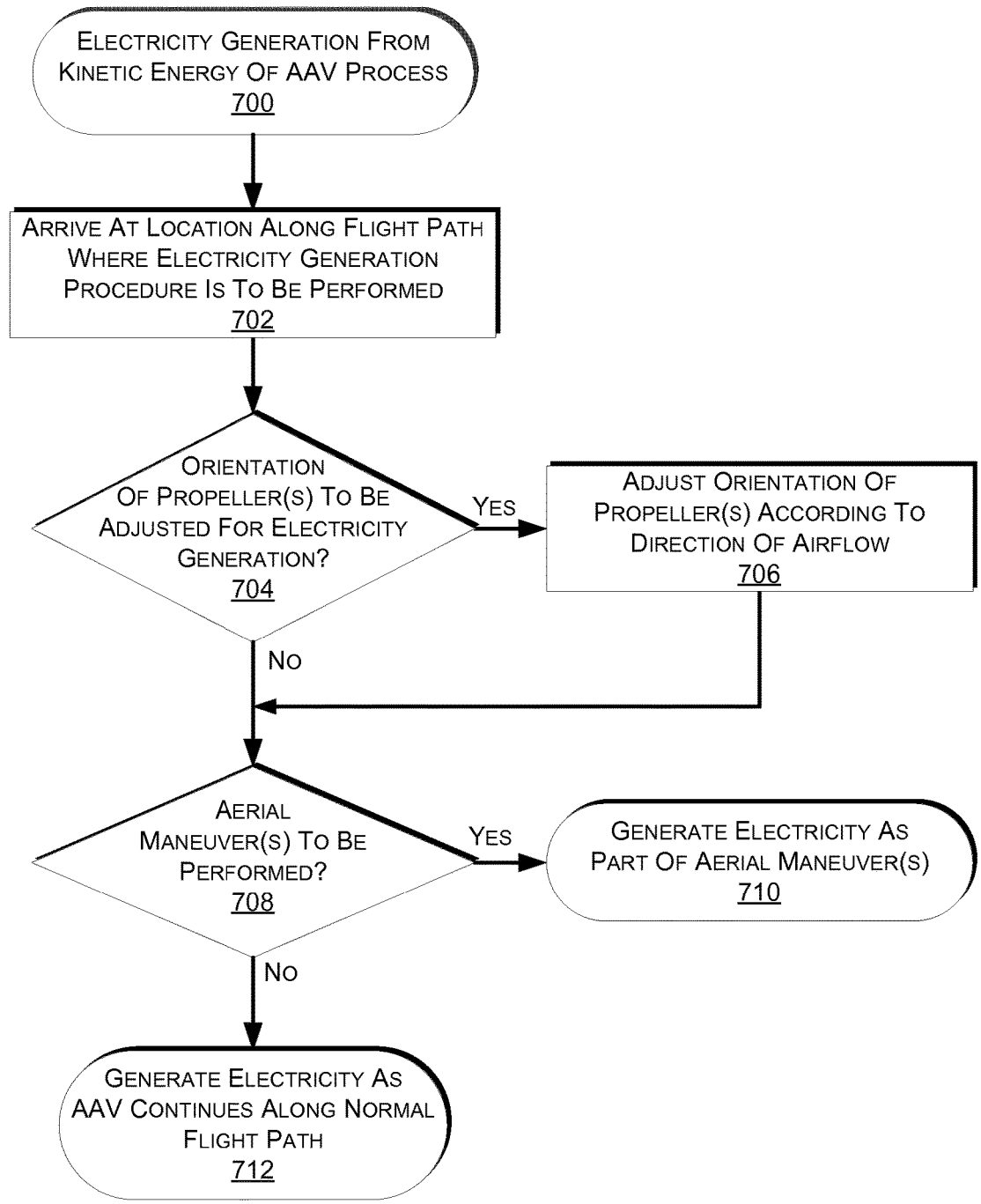
FIG. 7 depicts a flow diagram of an electricity generation from kinetic energy of an automated aerial vehicle process, according to some implementations.

FIG. 7 depicts a flow diagram of an example electricity generation from kinetic energy of an AAV process 700, according to some implementations. The example process begins by determining that the AAV has arrived at a location along the flight path where an electricity generation procedure will be performed, as in 702. In various implementations, the location along the flight path may be determined in advance based on certain parameters. For example, if the electricity generation procedure will require certain aerial maneuvers, the location may be selected based on an area along the flight path where the maneuvers may be safely performed, such as a sufficient distance away from any obstacles and/or populated areas. In various implementations, the location along the flight path may also be selected while the AAV is in flight based on certain dynamic parameters. For example, if a battery charge level is getting low, it may be determined that an electricity generation procedure should be performed at the AAV's current location.

Once it is determined that the AAV has arrived at a location where the electricity generation procedure will be performed, a determination is made as to whether the orientation of one or more propellers will be adjusted for the electricity generation, as in 704. It will be appreciated that the determination at 704 is similar to the determination at 610, as described above with respect to FIG. 6. If one or more of the propellers is to be adjusted for electricity generation, the orientation of the designated propellers may be adjusted according to the direction of the airflow, as in 706. A process for adjusting the orientation of the propellers according to the direction of the airflow will be described in more detail below with respect to FIG. 8.

Once the orientation of the propellers has been adjusted, as in 706, or if the orientation of the propellers is not to be adjusted, as in 704, a determination is made as to whether one or more aerial maneuvers will be performed, as in 708. If one or more aerial maneuver(s) are to be performed, then electricity is generated as part of the aerial maneuvers, as in 710. In various implementations, the one or more aerial maneuvers may include an aerial technique for which the resulting kinetic energy of the AAV may be utilized to generate electricity. For example, the AAV may be allowed to fall, or may alternatively be flown toward the ground, from which the kinetic energy of the AAV may be allowed to increase to a relatively significant level. Once the kinetic energy has reached a high level, one or more of the propellers may be allowed to convert the high relative airflow resulting from the high kinetic energy to a high spin rate, which may correspondingly generate a high current (e.g., for charging a battery, etc.). In an implementation where the AAV is to fly toward the ground, various techniques may be utilized (e.g. reversing the direction of rotation of the propellers, flipping the AAV upside down and flying downward, altering the pitch of the propellers to produce downward force, etc.).

If no aerial maneuvers are to be performed, as in 708, electricity is generated utilizing the kinetic energy of the AAV as it continues along its normal flight path, as in 712. For example, the AAV's normal flight path may include a descent period (e.g., after the AAV has flown over a structure or has otherwise been required to maintain a specific elevation during a portion of the flight path). In such instances, the kinetic energy of the AAV during the descent as the AAV passes down through the air may be utilized for rotating one or more propellers for electricity generation.

It will be appreciated that, unlike the process of FIG. 6, wherein specific wind conditions are required for the generation of electricity, the utilization of the kinetic energy of the AAV may be performed even when the air is otherwise relatively still and no wind exists. As described above, this movement of the AAV through the air creates an effective airflow relative to the AAV which is utilized to rotate the one or more propellers for the electricity generation.

Figure 8:
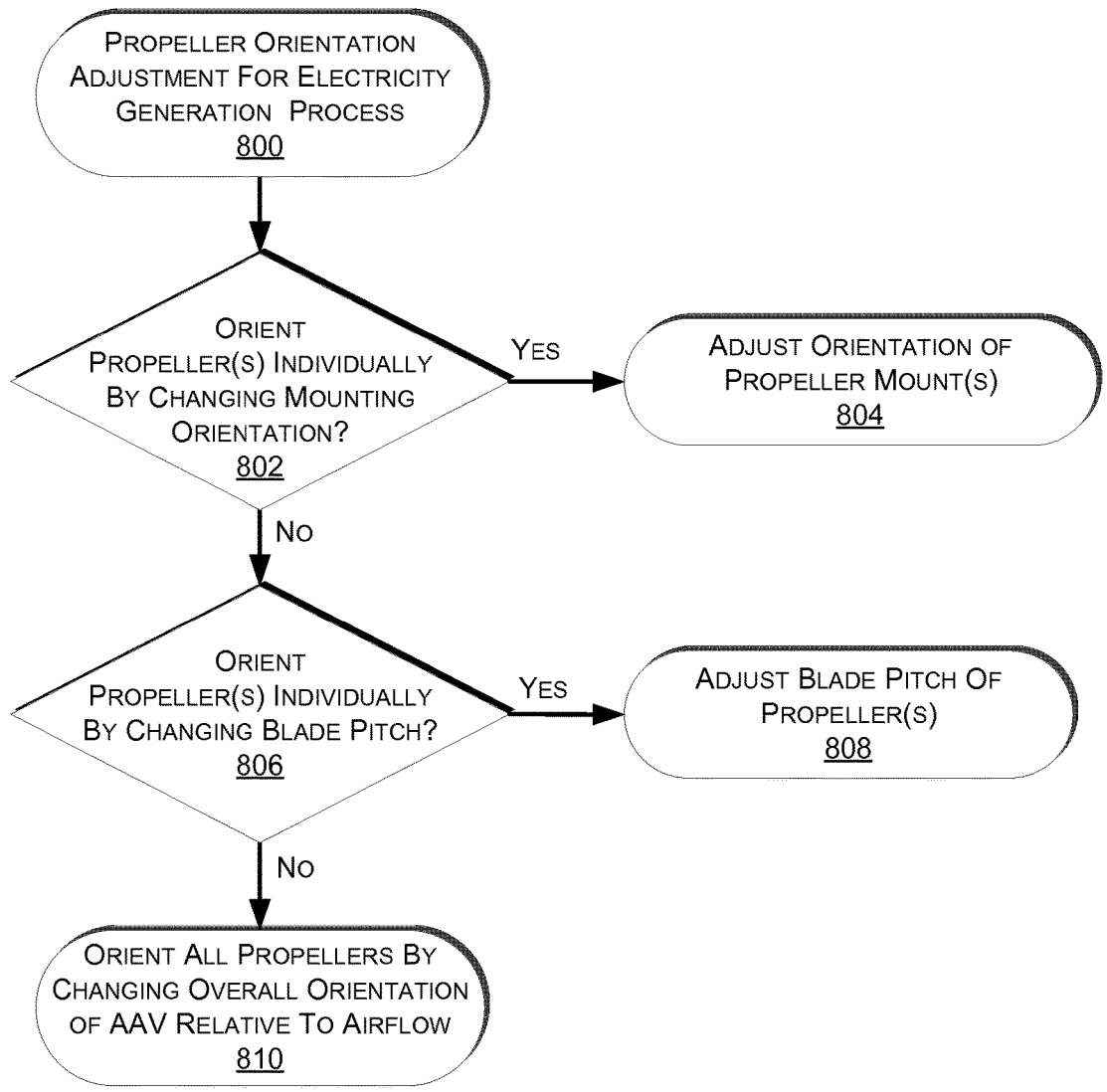
FIG. 8 depicts a flow diagram of a propeller orientation adjustment for electricity generation process, according to some implementations.

FIG. 8 depicts a flow diagram of an example propeller orientation adjustment for electricity generation process 800, according to some implementations. The example process begins by determining whether one or more propellers will be individually oriented relative to an airflow by adjusting the mounting orientations of one or more of the propellers, as in 802. As described above with respect to FIG. 3, in various implementations the mounting orientations of the motors and corresponding propellers may be individually adjustable with respect to the body of the AAV. For example, if it is known that an airflow will be coming toward the front of the AAV (e.g., from a wind), the orientation of a propeller for electricity generation may be adjusted to have the propeller face more forward from the AAV against the direction of the airflow. As another example, if it is known that an airflow will be coming up from beneath the AAV (e.g., as the AAV is allowed to fall or fly downward while in a normal horizontal orientation), the orientation of a propeller for electricity generation may be adjusted to have the propeller face more downward against the direction of the airflow.

If the mounting orientations for one or more of the propellers are to be individually adjusted, as in 802, the orientations of the propellers are correspondingly adjusted, as in 804. If the mounting orientations of one or more of the propellers are not to be individually adjusted, a determination is made as to whether the orientation of one or more of the propellers will be individually adjusted by adjusting the blade pitch of the propellers, as in 806. In various implementations, the blade pitch of the propellers may determine the corresponding efficiency of the propellers with respect to a given airflow. For example, the pitch of the propeller blade may determine the torque produced by the propeller for a given airflow and may be adjusted to optimize the efficiency of the propeller. If the orientation of one or more of the propellers is to be adjusted by changing the blade pitch, the blade pitch of the one or more propellers is adjusted, as in 808. If the blade pitch of one or more of the propellers is not to be adjusted, the orientation of all of the propellers together is adjusted by changing the orientation of the AAV as a whole, as in 810.

It will be appreciated that while in FIG. 8 certain techniques for altering the orientations of the propellers have generally been presented as alternatives to one another, in various implementations such techniques may be done in combination. For example, a given electricity generation procedure may include any combination of adjustments to individual propeller mountings, blade pitches and/or the orientation of the AAV as a whole. Similarly, in various implementations the techniques described above with respect to FIGS. 6 and 7, as well as other techniques for electricity generation, may also be done in combination. For example, a given electricity generation procedure may include any combination of utilizing the kinetic energy of the AAV and/or wind for generating electricity. As another example, other techniques may utilize similar principles (e.g., while the AAV is towed or otherwise attached to another AAV or other vehicle for pulling the AAV), for which one or more propellers may be rotated for generating electricity by the wind and/or relative movement of the AAV through the air.

Figure 9:
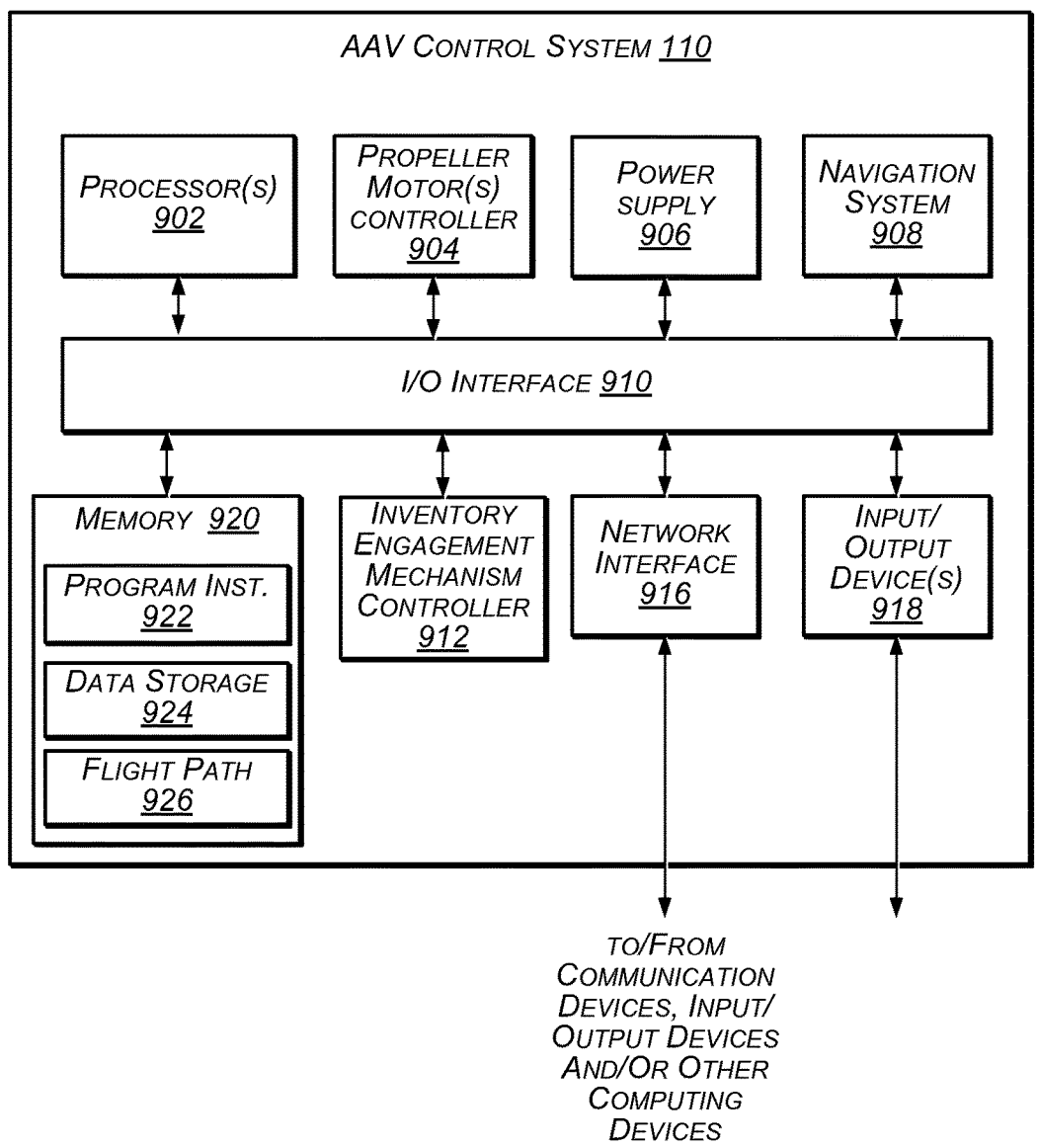
FIG. 9 is a block diagram illustrating various components of an automated aerial vehicle control system, according to an implementation.

FIG. 9 is a block diagram illustrating an example AAV control system 110 of the AAV 100. In various examples, the block diagram may be illustrative of one or more aspects of the AAV control system 110 that may be used to implement the various systems and methods discussed above. In the illustrated implementation, the AAV control system 110 includes one or more processors 902, coupled to a non-transitory computer readable storage medium 920 via an input/output (I/O) interface 910. The AAV control system 110 may also include a propeller motor controller 904, power supply module 906 and/or a navigation system 908. The AAV control system 110 further includes an inventory engagement mechanism controller 912, a network interface 916, and one or more input/output devices 918.

In various implementations, the AAV control system 110 may be a uniprocessor system including one processor 902, or a multiprocessor system including several processors 902 (e.g., two, four, eight, or another suitable number). The processor(s) 902 may be any suitable processor capable of executing instructions. For example, in various implementations, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 902 may commonly, but not necessarily, implement the same ISA.

The non-transitory computer readable storage medium 920 may be configured to store executable instructions, data, flight paths and/or data items accessible by the processor(s) 902. In various implementations, the non-transitory computer readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 920 as program instructions 922, data storage 924 and flight path data 926, respectively. In other implementations, program instructions, data and/or flight paths may be received, sent or stored upon different types of computer-accessible media, such as non-transitory media, or on similar media separate from the non-transitory computer readable storage medium 920 or the AAV control system 110. Generally speaking, a non-transitory, computer readable storage medium may include storage media or memory media such as magnetic or optical media, e.g., disk or CD/DVD-ROM, coupled to the AAV control system 110 via the I/O interface 910. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 916.

In one implementation, the I/O interface 910 may be configured to coordinate I/O traffic between the processor(s) 902, the non-transitory computer readable storage medium 920, and any peripheral devices, the network interface or other peripheral interfaces, such as input/output devices 918. In some implementations, the I/O interface 910 may perform any necessary protocol, timing or other data transformations to convert data signals from one component (e.g., non-transitory computer readable storage medium 920) into a format suitable for use by another component (e.g., processor(s) 902). In some implementations, the I/O interface 910 may include support for devices attached through various types of peripheral buses, such as a variant of the Peripheral Component Interconnect (PCI) bus standard or the Universal Serial Bus (USB) standard, for example. In some implementations, the function of the I/O interface 910 may be split into two or more separate components, such as a north bridge and a south bridge, for example. Also, in some implementations, some or all of the functionality of the I/O interface 910, such as an interface to the non-transitory computer readable storage medium 920, may be incorporated directly into the processor(s) 902.

The propeller motor(s) controller 904 communicates with the navigation system 908 and adjusts the power of each propeller motor to guide the AAV along a determined flight path. As described above, as part of various electricity generation procedures, one or more propellers may be selected for electricity generation functions. In various implementations, such electricity generation procedures may dictate changes to the operation of the selected propeller motors. For example, electricity may no longer be supplied to the associated propeller motors, the angles of the motor mounts may be adjusted, and/or any electricity generated by the propeller motors may be routed for various functions (e.g., recharging one or more batteries associated with the power supply module 906, powering one or more sensors, etc.).

The power supply module 906 may control the charging and any switching functions associated with one or more power modules (e.g., batteries) of the AAV. In various implementations, one or more monitors may be included for monitoring charge levels of the power modules. For example, a battery charge level may be monitored and an electricity generation procedure may be initiated when a battery charge level is determined to be below a designated threshold. Similarly, the electricity generation procedure may be determined to be complete once the battery has been recharged to a level that is above a designated threshold. In one implementation, the designated threshold may be determined at least in part according to a charge level that will be needed for the AAV to finish a flight path (e.g., for transporting an item to a delivery location and/or for returning to a materials handling facility).

The navigation system 908 may include a GPS or other similar system that can be used to navigate the AAV to and/or from a location. The inventory engagement mechanism controller 912 communicates with the motor(s) (e.g., a servo motor) used to engage and/or disengage inventory. For example, when the AAV is positioned over a level surface at a delivery location, the inventory engagement mechanism controller 912 may provide an instruction to a motor that controls the inventory engagement mechanism to release the inventory.

The network interface 916 may be configured to allow data to be exchanged between the AAV control system 110, other devices attached to a network, such as other computer systems, and/or with AAV control systems of other AAVs. For example, the network interface 916 may enable wireless communication between numerous AAVs. In various implementations, the network interface 916 may support communication via wireless general data networks, such as a Wi-Fi network. For example, the network interface 916 may support communication via telecommunications networks such as cellular communication networks, satellite networks, and the like.

Input/output devices 918 may, in some implementations, include one or more displays, image capture devices, thermal sensors, infrared sensors, time of flight sensors, accelerometers, pressure sensors, weather sensors, airflow sensors, etc. Multiple input/output devices 918 may be present and controlled by the AAV control system 110. One or more of these sensors may be utilized to assist in landings as well as avoiding obstacles during flight.

As shown in FIG. 9, the memory may include program instructions 922 which may be configured to implement the example processes and/or sub-processes described above. The data storage 924 may include various data stores for maintaining data items that may be provided for determining flight paths, retrieving inventory, landing, identifying a level surface for disengaging inventory, executing an electricity generation process, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the AAV control system 110 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The AAV control system 110 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated AAV control system 110. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the AAV control system 110 may be transmitted to the AAV control system 110 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other AAV control system configurations.

Figure 10:
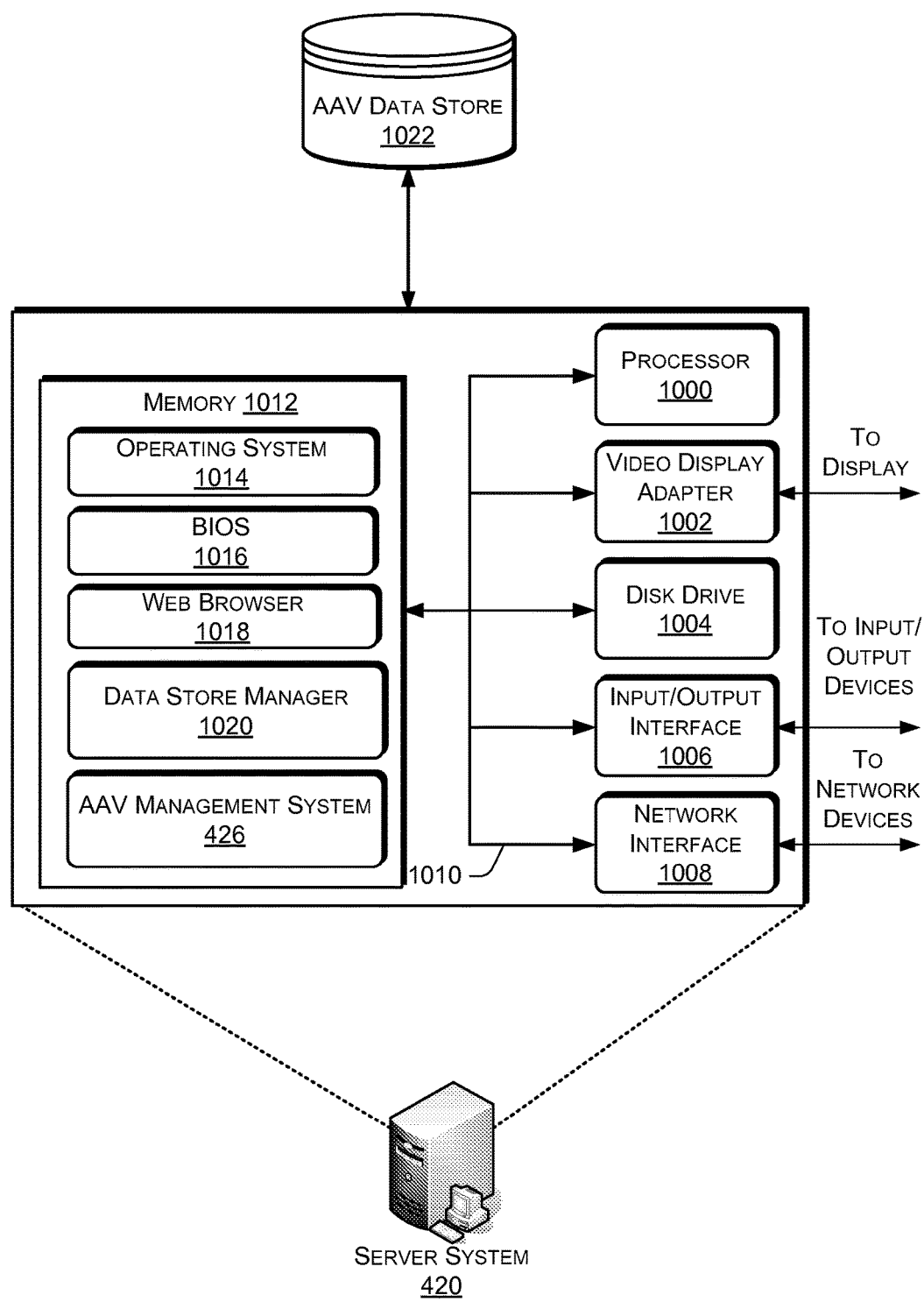
FIG. 10 is a block diagram of an illustrative implementation of a server system that may be used with various implementations.

FIG. 10 is a pictorial diagram of an illustrative implementation of a server system, such as the server system 420, that may be used in the implementations described herein. The server system 420 may include a processor 1000, such as one or more redundant processors, a video display adapter 1002, a disk drive 1004, an input/output interface 1006, a network interface 1008, and a memory 1012. The processor 1000, the video display adapter 1002, the disk drive 1004, the input/output interface 1006, the network interface 1008, and the memory 1012 may be communicatively coupled to each other by a communication bus 1010.

The video display adapter 1002 provides display signals to a local display (not shown in FIG. 10) permitting an operator of the server system 420 to monitor and configure operation of the server system 420. The input/output interface 1006 likewise communicates with external input/output devices not shown in FIG. 10, such as a mouse, keyboard, scanner, or other input and output devices that can be operated by an operator of the server system 420. The network interface 1008 includes hardware, software, or any combination thereof, to communicate with other computing devices. For example, the network interface 1008 may be configured to provide communications between the server system 420 and other computing devices, such as an AAV, materials handling facility, relay location and/or a delivery location, as shown in FIG. 4A.

The memory 1012 generally comprises random access memory (RAM), read-only memory (ROM), flash memory, and/or other volatile or permanent memory. The memory 1012 is shown storing an operating system 1014 for controlling the operation of the server system 420. A binary input/output system (BIOS) 1016 for controlling the low-level operation of the server system 420 is also stored in the memory 1012.

The memory 1012 additionally stores program code and data for providing network services to the AAV management system 426. Accordingly, the memory 1012 may store a browser application 1018. The browser application 1018 comprises computer executable instructions that, when executed by the processor 1000, generate or otherwise obtain configurable markup documents such as Web pages. The browser application 1018 communicates with a data store manager application 1020 to facilitate data exchange between the AAV data store 1022 and/or other data stores.

As used herein, the term "data store" refers to any device or combination of devices capable of storing, accessing and retrieving data, which may include any combination and number of data servers, databases, data storage devices and data storage media, in any standard, distributed or clustered environment. The server system 420 can include any appropriate hardware and software for integrating with the AAV data store 1022 as needed to execute aspects of one or more applications for the AAV management system, AAVs, materials handling facilities, delivery locations, and/or relay locations.

The data store 1022 can include several separate data tables, databases or other data storage mechanisms and media for storing data relating to a particular aspect. For example, the data store 1022 illustrated includes AAV information, weather information, wind speeds and directions, flight path information, source location information, destination location information, etc., which can be used to generate and deliver information to the AAV management system 426, materials handling facilities, delivery locations, AAVs, relay locations, and/or users. It should be understood that there can be many other aspects that may be stored in the AAV data store 1022. The data stores 1022 are operable, through logic associated therewith, to receive instructions from the server system 420 and obtain, update or otherwise process data in response thereto.

The memory 1012 may also include the AAV management system 426, discussed above. The AAV management system 426 may be executable by the processor 1000 to implement one or more of the functions of the server system 420. In one implementation, the AAV management system 426 may represent instructions embodied in one or more software programs stored in the memory 1012. In another implementation, the AAV management system 426 can represent hardware, software instructions, or a combination thereof.

The server system 420, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction in FIG. 10 should be taken as being illustrative in nature and not limiting to the scope of the disclosure.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer-implemented method for operating an automated aerial vehicle, comprising:
    under control of one or more computing systems configured with executable instructions,
        controlling a plurality of propeller motors to navigate the automated aerial vehicle along a flight path related to a delivery of an item, each of the propeller motors receiving electricity as supplied from a power supply for powering the propeller motor to rotate a respective propeller, wherein the power supply comprises a battery; and
        executing an electricity generation procedure, comprising:
            ceasing to supply electricity from the power supply to at least one of the propeller motors;
            adjusting an orientation of the respective propeller of the at least one propeller motor relative to an airflow that is able to rotate the respective propeller and correspondingly cause the at least one propeller motor to generate electricity, wherein the airflow that is able to rotate the respective propeller is provided at least in part by kinetic energy of the automated aerial vehicle as it moves through the air; and
            utilizing the electricity that is generated from the at least one propeller motor to at least one of recharge the battery of the power supply or power a sensor of the automated aerial vehicle; and
        controlling one or more of the plurality of propeller motors as powered by the power supply to fly the automated aerial vehicle along a remaining portion of the flight path after the electricity generation procedure is initiated and before a landing of the automated aerial vehicle.

2. A computer-implemented method for operating an automated aerial vehicle that includes a plurality of propeller motors and a power supply, the computer-implemented method comprising:
    under control of one or more computing systems configured with executable instructions,
        controlling the plurality of propeller motors to fly the automated aerial vehicle along a flight path, wherein each of the propeller motors is configured to rotate a respective propeller;
        adjusting an orientation of a respective propeller of a propeller motor relative to an airflow as part of an electricity generation procedure during which the airflow rotates the respective propeller and correspondingly causes the propeller motor to generate electricity, wherein the airflow that rotates the respective propeller is provided at least in part by kinetic energy of the automated aerial vehicle as the automated aerial vehicle moves through the air; and
        controlling one or more of the plurality of propeller motors as powered by the power supply to fly the automated aerial vehicle along a remaining portion of the flight path after the electricity generation procedure is initiated and before a landing of the automated aerial vehicle.

3. The computer-implemented method of claim 1, wherein the electricity generation procedure includes controlling the automated aerial vehicle to execute an aerial maneuver that increases the kinetic energy of the automated aerial vehicle so as to correspondingly increase the airflow.

4. A system for transporting items, the system comprising:
    an automated aerial vehicle, including:
        a plurality of motors, each motor coupled to a propeller and configured to rotate the propeller;
        a power supply connected to the plurality of motors and configured to provide electricity to the plurality of motors; and
        an inventory engagement mechanism for engagement and transport of items; and
    a computing system, including:
        one or more processors; and
        a memory coupled to the one or more processors and storing program instructions that when executed by the one or more processors cause the one or more processors to at least:
            control the plurality of motors to fly the automated aerial vehicle along a flight path;
            adjust an orientation of at least one propeller relative to an airflow as part of an electricity generation procedure during which the airflow rotates the at least one propeller to generate electricity, wherein the airflow that rotates the at least one propeller is provided at least in part by kinetic energy of the automated aerial vehicle as the automated aerial vehicle moves through the air; and
            control one or more of the plurality of motors as powered by the power supply to fly the automated aerial vehicle along a remaining portion of the flight path after the electricity generation procedure is initiated and before a landing of the automated aerial vehicle.

5. The system of claim 4, wherein the automated aerial vehicle further includes a network interface that enables wireless communication to and from the automated aerial vehicle.

6. The computer-implemented method of claim 1, wherein after the electricity generation procedure has been completed electricity is again supplied to the at least one propeller motor.

7. The system of claim 4, wherein the automated aerial vehicle further includes a navigation system comprising a GPS.

8. The system as recited in claim 4, wherein the adjusting of the orientation of the at least one propeller relative to the airflow includes at least one of changing an orientation of the at least one propeller relative to a body of the automated aerial vehicle, or changing an orientation of the automated aerial vehicle.

9. The system as recited in claim 4, wherein the automated aerial vehicle further includes a battery monitor for monitoring a battery charge level of a battery that is part of the power supply of the automated aerial vehicle and initiating the electricity generation procedure at least in part in response to the battery charge level reaching an amount that is below a threshold.

10. The system as recited in claim 9, wherein as part of the electricity generation procedure the battery of the automated aerial vehicle is charged and the electricity generation procedure is stopped once the battery charge level is above the threshold.

11. The system as recited in claim 4, wherein the automated aerial vehicle further includes an airflow sensor for sensing a speed of the airflow and initiating the electricity generation procedure at least in part in response to a determination that the speed of the airflow is above a designated threshold.

12. The system as recited in claim 4, wherein after a completion of the electricity generation procedure an orientation of the at least one propeller is changed to an orientation for helping to fly the automated aerial vehicle along the flight path.

13. The computer-implemented method of claim 2, wherein the adjusting of the orientation of the respective propeller relative to the airflow includes at least one of adjusting an orientation of the respective propeller relative to a body of the automated aerial vehicle, or adjusting an orientation of the automated aerial vehicle.

14. The computer-implemented method of claim 2, wherein the electricity generation procedure is initiated at least in part in response to a determination that a charge level of the power supply of the automated aerial vehicle has reached an amount that is below a threshold.

15. The computer-implemented method of claim 2, wherein after a completion of the electricity generation procedure, an orientation of the respective propeller is changed to an orientation that will aid a flight of the automated aerial vehicle along the flight path.

16. The computer-implemented method of claim 2, wherein the electricity generation procedure includes controlling the automated aerial vehicle to execute an aerial maneuver that increases the kinetic energy of the automated aerial vehicle so as to correspondingly increase the airflow.

17. The computer-implemented method of claim 16, wherein the aerial maneuver includes flying the automated aerial vehicle toward the ground in order to increase the kinetic energy.

18. The computer-implemented method of claim 17, wherein the flying of the automated aerial vehicle toward the ground includes reversing the direction of rotation of one or more of the propellers to produce downward force.

19. The computer-implemented method of claim 17, wherein the flying of the automated aerial vehicle toward the ground includes rotating the automated aerial vehicle upside down and flying downward.

20. The computer-implemented method of claim 17, wherein the flying of the automated aerial vehicle toward the ground includes altering the pitch of one or more of the propellers to produce downward force.

21. The computer-implemented method of claim 2, wherein the adjusting of the orientation of the respective propeller relative to the airflow results in a change to an orientation offset of a plane of rotation of the respective propeller relative to the body of the automated aerial vehicle.

\* \* \* \* \*